Patented June 17, 1924.

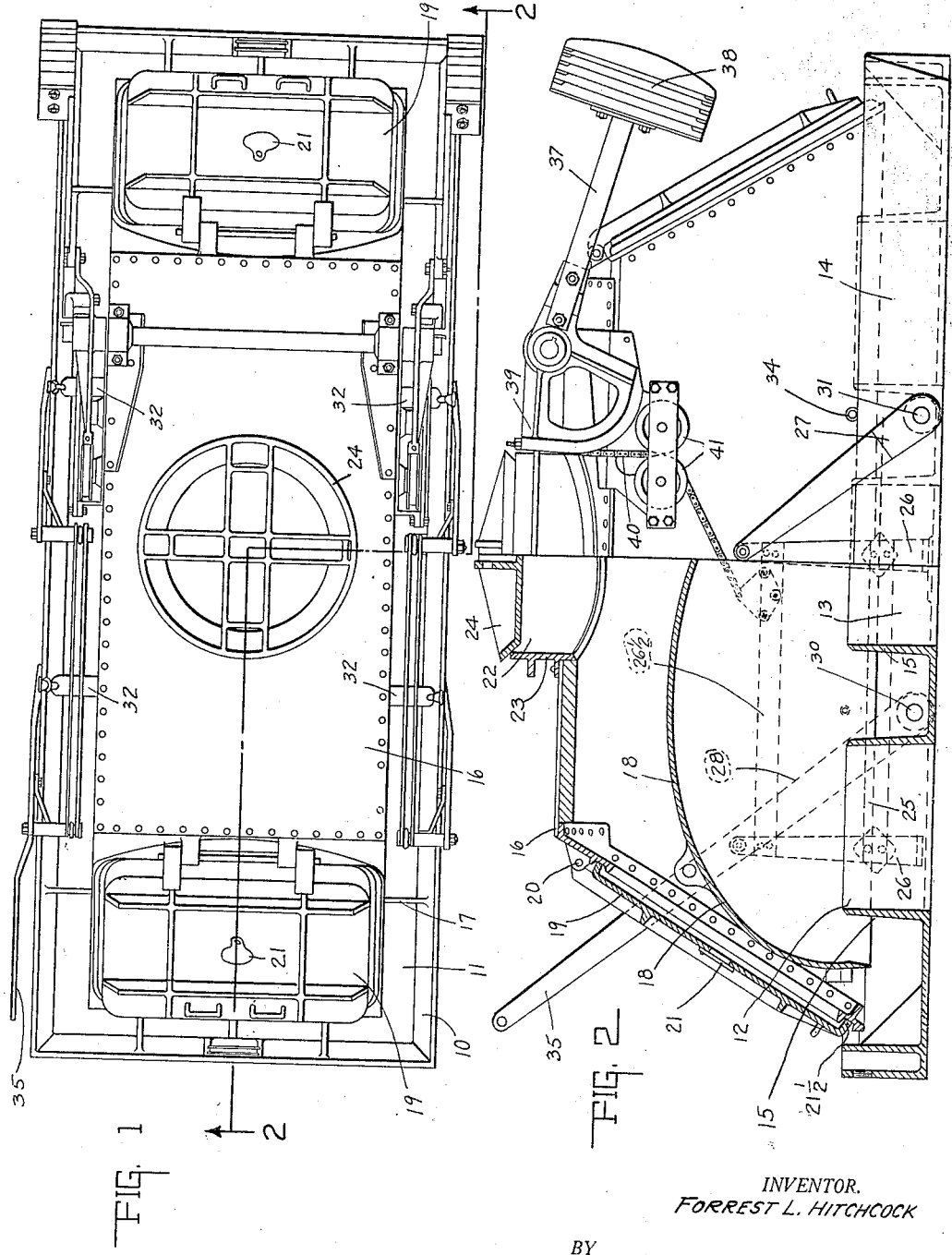

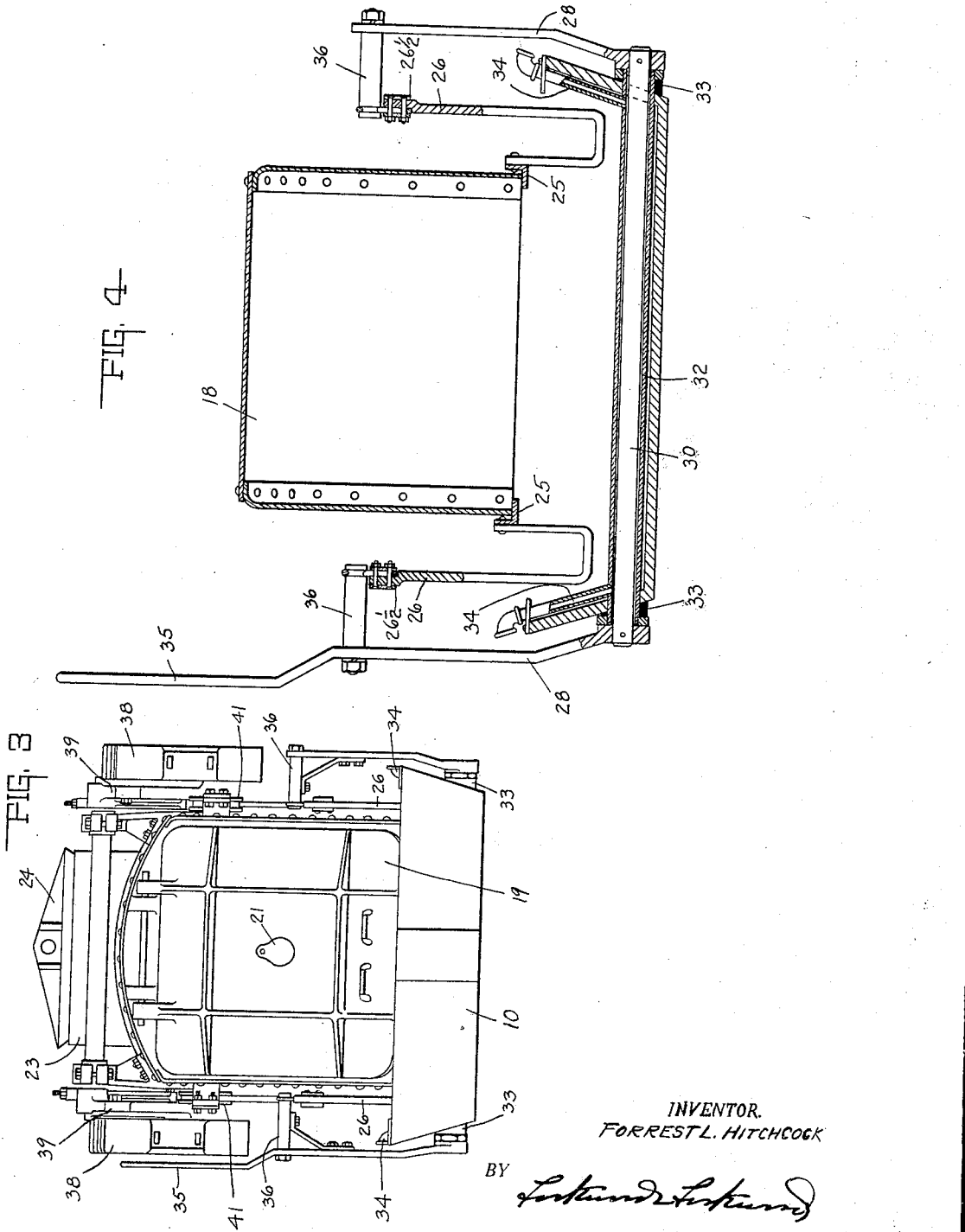

1,497,908

UNITED STATES PATENT OFFICE.

FORREST L. HITCHCOCK, OF INDIANAPOLIS, INDIANA, ASSIGNOR TO THE MARIETTA MANUFACTURING COMPANY, OF INDIANAPOLIS, INDIANA, A CORPORATION.

REVERSING VALVE.

Application filed January 20, 1923. Serial No. 613,833.

*To all whom it may concern:*

Be it known that I, FORREST L. HITCHCOCK, a citizen of the United States, and a resident of Indianapolis, county of Marion, and State of Indiana, have invented a certain new and useful Reversing Valve; and I do hereby declare that the following is a full, clear, and exact description thereof, reference being had to the accompanying drawings, in which like numerals refer to like parts.

This invention relates to certain new and useful improvements in reversing valves, such as are used in connection with glass and steel melting tanks and the like, for directing the current of air or gas alternately to one side or the other of the furnaces while at the same time controlling the flow of the products of combustion to the stack. This valve is of the swinging oscillating type, substantially the same as that shown and described in U. S. Letters Patent No. 1,045,749, patented November 26, 1912.

The main object of the invention is to so arrange and construct the actuating and reversing mechanism that it may be more easily operated, and the moving parts and bearings thereof may be kept well lubricated and cleaned. Heretofore in valves of this type, and particularly that shown in the above mentioned Letters Patent, difficulty has been experienced because of the operating shaft and bearings being located within the water seal or bed and consequently exposed to the actions of the water and particularly to the accumulation of carbon, tar and similar deposits. It is found in actual use that the carbon and like deposits accumulate in large quantities in the bottom or water seal of the valve and, being of a sticky nature, seriously oppose the throwing of the valve. Under these conditions it either takes two or three or more men to throw the valve, or electrical or mechanical power has to be applied in order to overcome the resistance of the bearing surface produced in the present construction.

The particular feature of this invention is to so construct the operating means as to avoid the above difficulties by mounting the operating lever on the outside of the water seal and providing a sealed bearing extending therethrough which will be protected from the water, carbon and the like, and can be conveniently oiled and maintained in properly lubricated condition. This construction permits one man to easily throw the valve and maintains the bearings and operative parts in clean and well lubricated condition. Such construction further eliminates the necessity of getting into the hood and water seal and scraping this deposit from the exposed surfaces, which is not only a time-consuming and tedious job, but a very difficult one owing to the intense heat.

The full nature of this invention will be understood from the accompanying drawings and the following description and claims.

In the drawings Fig. 1 is a plan view of a reversing valve. Fig. 2 is a side elevation of a portion thereof, and a central vertical cross section through another portion as indicated on the line 2—2 of Fig. 1. Fig. 3 is an end elevation of the valve. Fig. 4 is a central longitudinal cross section through the valve supporting and actuating shaft, with the enclosing bearing and lubricating means.

In the drawings there is shown a bed plate 10 having an upwardly projecting rim about the periphery thereof, at a height sufficient to hold the desired depth of the water contained in the water seal. Water is introduced and circulated within the bed plate through a suitable inlet and outlet, not shown herein. Extending upwardly and through the bed plate, and positioned in longitudinal alignment through the center thereof, there are valve openings or ports 12, 13 and 14. Said openings or ports are provided with annular flanges 15 integral with the bed plate and extending to a height equal to the surrounding rim for preventing the water contained in the water seal from entering said openings or ports. The flue opening 12 leads to one end of the furnace and the flue opening 14 leads to the other end thereof, while the intermediate flue opening 13 communicates with the chimney or stack.

Mounted over the flue openings and within the rim of the bed plate there is a steel casing 16 which is lined with fire brick or similar heat resisting material which is supported on suitable webs 17 formed integral with the bed plate, whereby the bottom of said casing will be supported between the bed plate and the top of the surrounding rim and water surface, so that a water seal will be formed separating the interior of the casing from the outside. Said casing has sufficient height and width to permit the free movement of the valve hood 18 and is of a width slightly greater than the diameter of the flue opening so as to enclose the same therein. The ends of the casing are arranged to slope upwardly from the bottom to the top and are provided with end openings of sufficient dimensions to permit the removal of the hood 18 therethrough, which openings are closed by the doors 19 hinged at 20. Said doors are provided with peep holes and covers 21. The edges 21½ of the door 19 rest in suitable grooves formed about the periphery of the door opening so as to seal said opening and prevent leakage of gases therethrough. In the top of the casing there is a central opening 22 surrounded by a connecting collar 23 in which the mushroom valve 24 is adapted to seat.

The hood 18 is slidably mounted on the ways 25 so as to be readily slid therefrom through the door openings for replacement or repair. The ways are pivotally mounted upon a pair of vertical upright supporting levers 26 which are tied at their top by the cross bar 26½. Said supporting levers are hung upon the rocking hood shifting levers 27 and 28 which are pivotally mounted and supported upon the bed plate and are pivotally attached to the levers 26 at their upper ends. The position of the shifting levers 27 and 28 is such that upon their being moved about their lower supporting pivot point, they will cause the levers 26 to be elevated and swung longitudinally to a new position, carrying with them the ways 25 and the hood 18. This movement causes the hood 18 to be lowered to such a position that its lower edges will extend below the surface of the water and thereby be water sealed, so as to enclose and seal the flue openings 12 and 13. This will cause the gases to be drawn from one end of the furnace through the opening 12 into the hood and through the opening 13 to the flue or stack. When the levers 27 and 28 are moved to their opposite position, the hood will be raised from the water seal over the top edges of the valves of said flue openings, and carried or swung longitudinally to a new position inclosing the flue opening 13 with the flue opening 14. The gases are then drawn from the other end of the furnace through the openings 14 and hood, to the stack through the opening 13.

The operating mechanism for moving the hood comprises a pair of longitudinally extending shafts 30 and 31 which extend across the bottom of the dam plate from one side to the other through the enclosing bearing tubes 32. Said bearing tubes extend through the bed plates on each side and are sealed by the lead packing 33 so as to prevent water leaking therethrough. For lubricating the shafts extending through said bearing tubes, there are provided lubricating pipes 34 communicating with said tubes 32 adjacent each end thereof and extending upwardly to a point above the bed plate for conveniently permitting the introduction of lubricant. Keyed to each end of the shafts outside of the water seal or bed plates are the hood shifting levers 27 and 28, one of the levers 28 having on one side thereof an extension or operating lever handle 35. Said levers 27 and 28 are provided with inwardly extending supporting pins 36 on which are pivotally hung the levers 26 which support the hood 18. Said levers 26 extend downwardly on the outside of the hood and under the lower edge of the same, as indicated in Fig. 4.

For counter balancing the weight of the hood there is provided on each side thereof the arms 37 having the weights 38 secured on one end thereof, which are pivoted at their other ends to the casing, and have rigidly secured thereto the blocks 39 to which the chains 40 are attached. The chains 40 extend between the pulleys 41 mounted on the side of the casing and are connected to the cross bars 26½. It will be observed that the weight of the hood would be counterbalanced by the weights 38 so as to facilitate the lifting and swinging movement thereof.

The invention claimed is:

1. In a reversing valve having a water sealed bed plate and a hood mounted thereon adapted to move on said bed plate for reversing said valve, a casing surrounding said hood, means positioned without said casing for moving said hood, said means being pivotally mounted, and a closure for the bearing surface of said pivotally mounted means for protecting the same and maintaining lubricant therein.

2. In a reversing valve of the class described provided with a water sealed bed plate, a hood movably mounted on said bed plate, a water sealed casing surrounding said hood, and means pivotally mounted without said bed plate for supporting said hood in swinging position whereby it may be swung from one position to another within said casing.

3. In a reversing valve of the class described provided with a water-sealed bed plate, a hood movably mounted on said bed plate, a water-sealed casing surrounding said hood, a shaft extending transversely of said bed plate from one side to the other, a bearing tube surrounding said shaft and sealed in the sides of said bed plate for protecting said shaft from the contents thereof, and supporting means keyed to the end of said shaft for swingingly supporting said hood.

4. In a reversing valve of the class described provided with a water sealed bed plate, a hood movably mounted on said bed plate, a water sealed casing surrounding said hood, a shaft extending transversely of said bed plate, supporting levers keyed to said shaft for supporting said hood in swinging position, means for enclosing said shaft for protecting the same from the water and foreign matter within said bed plate, and means connected with said enclosing means for lubricating said shaft.

5. In a reversing valve of the class described provided with a water sealed bed plate, a hood movably mounted on said bed plate, a water sealed casing surrounding said hood, a shaft extending transversely of the bed plate and protected from the contents thereof, and supporting members keyed to the ends of said shaft without said bed plate for swingingly supporting said hood.

6. In a reversing valve of the class described provided with a water sealed bed plate, a hood movably mounted on said bed plate, a water sealed casing surrounding said hood, a shaft extending transversely of said bed plate, a bearing tube surrounding said shaft and sealed in the side of said bed plate for protecting said shaft from the contents thereof, and supporting means keyed to the end of said shaft on the outside of said bed plate for swingingly supporting said hood therein.

7. In a reversing valve of the class described provided with a water sealed bed plate, a hood movably mounted on said bed plate, a water sealed casing surrounding said hood, a shaft extending transversely of said bed plate, a bearing tube surrounding said shaft and sealed in the side of said bed plate for protecting said shaft from the contents thereof, supporting means keyed to the end of said shaft on the outside of said bed plate for swingingly supporting said hood therein, and a lubricating pipe communicating with said bearing tube for permitting the lubrication thereof.

In witness whereof, I have hereunto affixed my signature.

FORREST L. HITCHCOCK.